(12) United States Patent
Hottgenroth et al.

(10) Patent No.: US 11,606,444 B2
(45) Date of Patent: Mar. 14, 2023

(54) METHOD AND COMMUNICATION SYSTEM FOR EXCHANGING DATA BETWEEN SEVERAL FIELD DEVICES

(71) Applicant: KROHNE Messtechnik GmbH, Duisburg (DE)

(72) Inventors: Wolfgang Hottgenroth, Essen (DE); Julia Bublitz, Herten (DE); René Keimling, Duisburg (DE)

(73) Assignee: KROHNE Messtechnik GmbH, Duisburg (DE)

( * ) Notice: Subject to any disclaimer, the term of this patent is extended or adjusted under 35 U.S.C. 154(b) by 0 days.

(21) Appl. No.: 17/646,692

(22) Filed: Dec. 31, 2021

(65) Prior Publication Data

US 2022/0217217 A1 Jul. 7, 2022

(30) Foreign Application Priority Data

Jan. 2, 2021 (DE) .......................... 102021000005.6

(51) Int. Cl.
*H04L 67/55* (2022.01)
*H04L 67/562* (2022.01)
*G05B 19/418* (2006.01)

(52) U.S. Cl.
CPC .......... *H04L 67/55* (2022.05); *G05B 19/4185* (2013.01); *H04L 67/562* (2022.05); *G05B 2219/25428* (2013.01)

(58) Field of Classification Search
CPC .............................. H04L 67/55; H04L 67/562
See application file for complete search history.

(56) References Cited

U.S. PATENT DOCUMENTS

| | | | |
|---|---|---|---|
| 2004/0015543 A1* | 1/2004 | Schmidt | G06Q 10/10 709/203 |
| 2019/0185238 A1 | 6/2019 | Thomas et al. | |
| 2020/0067903 A1* | 2/2020 | Yegorin | H04L 67/562 |

FOREIGN PATENT DOCUMENTS

| | | |
|---|---|---|
| EP | 1383062 A2 | 1/2004 |
| WO | 2019185238 A1 | 10/2019 |

* cited by examiner

*Primary Examiner* — Wing F Chan
*Assistant Examiner* — Billy H Ng
(74) *Attorney, Agent, or Firm* — Whitmyer IP Group, LLC (57) ABSTRACT

A method for exchanging data between several field devices includes: implementing an exchange of data between a requesting field device and a responding field device using a publish-subscribe principle; subscribing the responding field device to request messages whose message titles include a specification of a field device identifier of the responding field device; subscribing the requesting field device to response messages whose message titles include a request identifier known to the requesting field device; the requesting field device publishing a request message to a data broker, the message title of the request message including the request identifier and the specification; the responding field device receiving the request message, evaluating the request message, and publishing a corresponding response message to the data broker, the message title of the response message including the request identifier; and the requesting field device receiving the response message based on the subscription to the response message.

20 Claims, 8 Drawing Sheets

METHOD AND COMMUNICATION SYSTEM FOR EXCHANGING DATA BETWEEN SEVERAL FIELD DEVICES

TECHNICAL FIELD

The invention relates to a method for exchanging data between several field devices, wherein the field devices are in a communication connection based on the publish-subscribe principle via a data broker with a broker functionality, wherein at least one field device publishes at least one message with a message title to the data broker, wherein at least one field device subscribes to a message with at least a specific component of a message title to the data broker, wherein the message published to the data broker is received by the data broker and the data broker forwards the received message to the at least one field device, which field device subscribed to the message, with corresponding component of the message title to the data broker. Furthermore, the invention also relates to a similar communication system with several field devices and at least one data broker with a broker functionality, wherein, for the exchange of data between several field devices, the field devices are in a communication connection via the data broker based on the publish-subscribe principle, wherein during operation of the communication system at least one field device publishes at least one message with a message title to the data broker, wherein at least one field device subscribes to a message with at least one specific component of a message title at the data broker, wherein the message published to the data broker is received by the data broker and the data broker forwards the received message to the at least one field device, which field device has subscribed to the message with the corresponding component of the message title at the data broker.

BACKGROUND

When field devices are referred to here, this primarily means field devices of process and automation technology. These field devices are installed "in the field", i.e. in an industrial process environment, and are used as sensors and/or actuators. As sensors, they record physical state variables of the process, for example, temperatures, pressures, flow rates, fill levels and pH values; as actuators, they act on the industrial process, for example, as pumps, control valves, heaters, mechanical drives, etc. The field devices installed in a process are usually connected to each other via a communication link in order to exchange data, for example, to jointly perform a control-related task in the process.

A principle for implementing a communication link that has been known for many years is the publish-subscribe principle mentioned at the beginning, which has its origins in industrial applications and has recently received increased attention again due to applications in the setting of the "Internet of Things (IoT)". With this communication principle, the communication partners involved, in this case in the form of the field devices, know nothing about each other. A field device is therefore not able to publish a message directly to another field device or to address a message directly to another field device. The exchange of messages between field devices is done via the data broker. The messages have a message title and a message content. Field devices can publish messages to the data broker and field devices can subscribe to messages with a specific message title—or the component of a message title—from the data broker (subscribe). When the data broker receives a message from a field device, the data broker evaluates the message title of the received message and then forwards the message to field devices that subscribe to messages of that specific message title—or a component of that message title. An example of a protocol that implements the publish-subscribe principle is the Message Queue Telemetry Transport protocol (MQTT protocol).

An advantage of the publish-subscribe principle is that in order to establish communication, the individual field devices do not need to have knowledge of the structure and subscribers of the communication network in order to participate in communication over the network.

The invention is based on the knowledge that, particularly in control and process engineering applications, it would be advantageous if a field device could actively request information from another field device, even though the field devices are only connected to each other by means of a communication link based on the publish-subscribe principle, which in principle does not provide for this functionality.

SUMMARY

The object of the present invention is thus to further develop the method mentioned at the beginning for exchanging data between several field devices, wherein the field devices are connected to one another via a data broker with a broker functionality in a communication link based on the publish-subscribe principle, and the said communication system with several field devices and at least one data broker with a broker functionality in such a way that the exchange of messages between field devices as required is enabled.

The previously derived object is achieved by the method described at the beginning for exchanging data between several field devices and in the communication system with several field devices and a data broker in that an exchange of data between a requesting field device and a responding field device based on the request-response principle is implemented by means of the publish-subscribe principle. This is initially done by making a unique field device identifier of the responding field device known at least to the requesting field device. How this is done in detail is not important at first; various possibilities are readily conceivable. In any case, the potentially requesting field device now knows to which other, i.e. potentially responding, field device it could send a request.

Furthermore, the responding field device subscribes to request messages whose message title includes a specification of its own field device identifier, i.e. the field device identifier of the responding field device. Request messages are therefore "normal" messages of the publish-subscribe principle, which are only characterized in that their message titles contain a specification of the field device identifier of the responding field device from which information is requested. By means of this specification, the field device from which information is to be requested can be addressed practically directly, using the means of the publish-subscribe principle.

When it is said that the message titles include a specification of the field device identifier of the responding field device, then, in the simplest case, this is the field device identifier of the responding field device itself. However, the specification for the field device identifier of the responding field device can also be derived from the field device identifier of the responding field device—in an unambiguous manner. This is meant to express that the specification for the field device identifier of the responding field device is information that is individually characteristic for the responding field device but does not necessarily have to be identical—but can be identical—to the field device identifier. For security reasons, for example, an algorithm could be stored in those field devices that are to be able to exchange information with each other in the manner described here—request/response using the publish/subscribe principle. Other field devices are to be prevented from doing this, for which purpose a different algorithm is simply stored in them for deriving the specification from the field device identifier.

Furthermore, the requesting field device subscribes to response messages whose message titles include a request identifier known to the requesting field device. Thus, the requesting field device practically opens a communication channel using the means of the publish-subscribe principle, via which it can be directly addressed.

Finally, the requesting field device publishes a request message to the data broker, where the message title of the request message includes the request identifier and the specification for the field device identifier of the responding field device. The responding field device then receives the request message from the requesting field device based on the request message subscription. The responding field device then evaluates the request message and publishes a corresponding response message to the data broker, wherein the message title of the response message comprises at least the request identifier. The requesting field device necessarily receives the response message from the responding field device due to the subscription to the response message.

In a further development of the method and the communication system according to the invention, it is provided that the request identifier is an invariable specification for the field device identifier of the requesting field device or a unique identifier for each individual request. If the request identifier is an invariable specification to the field device identifier of the requesting field device, then the requesting field device can only recognize that it is receiving a response to a request—which may be one of several of its requests. If the requesting field device expects multiple responses, these must be distinguished using other criteria, such as an additional identifier of the responding field device or by evaluating the message content. If, on the other hand, the request identifier is a unique identifier for each request, different requests can also be clearly distinguished on the basis of the message title alone.

Another advantageous embodiment of the method and the communication system is that the requesting field device subscribes to response messages whose message titles additionally comprise the specification for the field device identifier of the responding field device, and that the message titles of the response message additionally comprise the specification for the field device identifier of the responding field device. This measure makes it readily apparent to the requesting field device from which field device it is receiving a response message. As explained above, this, in particular, makes it possible to work with request identifiers which are an invariable specification to the field device identifier of the requesting field device.

According to another further development of the method and the communication system, it is provided that the responding field device subscribes to request messages whose message titles additionally have a request/response identifier in order to achieve a distinguishability of response messages and request messages by evaluating the message title alone. For this purpose, the requesting field device subscribes to response messages whose message titles additionally have a request/response identifier, furthermore, the requesting field device publishes a request message to the data broker, where the message title of the request message additionally has a request/response identifier. The responding field device publishes the response message to the data broker, wherein the message title of the response message additionally comprises a request/response identifier, wherein the request/response identifier either identifies a request (for example, by the specification "Request") or identifies a response (for example, by the specification "Response"), so that, by evaluating the request/response identifier, it can be decided by a receiving field device whether it is a request or a response to a request.

A further development of the method and the communication system is characterized in that the responding field device subscribes to request messages whose message titles additionally have a ReqResp identifier, that the requesting field device subscribes to response messages whose message titles additionally have the ReqResp identifier, that the requesting field device publishes a request message to the data broker, wherein the message title of the request message additionally has the ReqResp identifier that the responding field device publishes the response message to the data broker, wherein the message title of the response message additionally has the ReqResp identifier, wherein the ReqResp identifier identifies a communication using the request/response principle, so that it can be easily decided by evaluating the ReqResp identifier whether it is a message with which the request/response principle is implemented or a "normal" message of the original publish/subscribe communication principle. This makes it very easy to distinguish between normal publish/subscribe messages and request/response messages implemented by means of the publish/subscribe principle, which can be helpful, for example, when debugging the communication implementation.

In another advantageous embodiment of the method and communication system, it is implemented that the responding field device subscribes to request messages whose message titles additionally have a protocol identifier, that the requesting field device subscribes to response messages whose message titles additionally have the protocol identifier, that the requesting field device publishes a request message to the data broker, wherein the message title of the request message additionally has the protocol identifier that the responding field device publishes the response message to the data broker, wherein the message title of the response message additionally has the protocol identifier, wherein the protocol identifier indicates which communication protocols are understood by a subscribing field device and in which protocol a sending field device sends message content. This enables the targeted interpretation of a message content, in particular if different messages of different protocols are to be transmitted and processed.

A further development of the method and the communication system is directed at the question of how the unique field device identifier of the responding field device is made known to the requesting field device. Preferably, this is done by at least one field device with a unique field device identifier sending a log-in message with a log-in message title to the data broker, wherein the log-in message title comprises a generic log-in identifier and the unique field device identifier of the field device. The data broker stores the at least one log-in message. In the event that another field device subscribes to messages with the generic log-in identifier in the message title, the data broker publishes the at least one stored log-in message to the log-in message subscribing field device. The field device subscribing to log-in messages then obtains an overview of the participating field devices by evaluating the log-in message titles of the received log-in messages. Preferably, then, the data broker is used as the central log-in point for the participating field devices, with the option of making the log-in data, i.e., the field device identifiers of the respective field devices, known to the other field devices as well. It is also conceivable to bring corresponding information to the field devices when the field devices in communication with each other are set up, for example with an external service device that is connected to each field device. However, this is considerably more complex, but may be more in line with certain safety considerations.

In connection with the previously described distribution of field device identifiers, a preferred design of the method and communication system is that when a field device with a unique field device identifier is connected to the data broker, the field device automatically publishes a log-in message to the data broker and/or that when a field device with a unique field device identifier is connected to the data broker, the field device automatically subscribes to messages with the general log-in identifier in the message title.

Another further development of the subscription process provides that the subscription message title of the subscription message additionally comprises a specification of the field device type and/or the field device manufacturer and/or the field device protocol.

In a preferred practical implementation of the previously described method and the previously described communication system, the broker functionality of the data broker and the communication link based on the publish-subscribe principle are implemented using the MQTT protocol (Message Queue Telemetry Transport protocol). In particular, the log-in messages are implemented as retained messages, i.e., as MQTT messages with the retain flag set, so that the log-in messages are stored persistently on the data broker. This ensures that replaced or newly added field devices receive all log-in messages in full when they reconnect to the data broker.

The preferred designs and further developments of the method and of the communication system can be implemented in connection with the respective design according to the invention according to the disclosed features each individually or also in any combination with each other, unless a preferred design has been expressly described only in connection with another preferred design.

BRIEF DESCRIPTION OF THE DRAWINGS

In detail, there are now various possibilities for designing and further developing the method according to the invention for exchanging data between several field devices and the communication system with several field devices and at least one data broker with a broker functionality. For this, reference is made to the following description of preferred embodiments in connection with the drawings.

DETAILED DESCRIPTION

FIGS. 1 to 8 show, in principle and in various embodiments, a method 1 for exchanging data between several field devices 2, 2a, 2b, wherein the field devices 2, 2a, 2b are in a communication link based on the publish-subscribe principle via a data broker 3 with a broker functionality, and a communication system 4 with several field devices 2, 2a, 2b and a data broker 3 with a broker functionality, wherein for the exchange of data between several field devices 2, 2a, 2b, the field devices 2, 2a, 2b are in a communication link based on the publish-subscribe principle via the data broker 3. The figures have various textual specifications, without which the figures would be difficult to understand; therefore, they can also be understood as meaningful reference signs. These textual specifications are reproduced here in the description text in brackets in order to ensure an easily readable distinction from the description text.

In general, the communication link based on the publish-subscribe principle causes a field device 2 to publish (publish) at least one message with a message title to the data broker 3, whereby at least one field device 2 subscribe (subscribe) to a message with at least one specific component of a message title to the data broker 3. The message sent to the data broker 3 is received by the data broker 3, and the data broker 3 forwards the received message to the at least one field device 2, which field device 2 subscribes (subscribe) to the message with corresponding component of the message title at the data broker 3. In the figures, the sending of messages and instructions is graphically indicated by arrows showing the direction of information transport.

The communication link based on the publish-subscribe principle does not allow one field device 2 to retrieve information from another field device 2 as needed. In principle, this is not provided for; messages are only ever forwarded to subscribers—irrespective of the information requirements of a participating field device 2—if these messages are actively generated and published by the field device 2 concerned, i.e. sent to the data broker 3.

The embodiments of the methods 1 and communication systems 4 shown in FIGS. 1 to 8 illustrate one way in which the means of the publish-subscribe principle can nevertheless be used to implement communication between field devices 2 in which information from participating field devices 2 can be retrieved from other field devices 2.

Common to all embodiments in FIGS. 1 to 8 is that an exchange of data based on the request-response principle between a requesting field device 2a and a responding field device 2b is implemented by means of the publish-subscribe principle in that a unique field device identifier (F_Resp_ID) of the responding field device 2b is made known 5 at least to the requesting field device 2a. The two further field devices 2, each shown at the top of the figures, merely illustrate that of course far more field devices 2 can be connected to the data broker 3 than the requesting field device 2a and the responding field device 2b, on the basis of which the operating principle of the new implementation of communication is explained.

The responding field device 2b subscribes (subscribe: f(F_Resp_ID)) request messages 6 whose message title includes a specification (f(F_Resp_ID)) for the field device identifier F_Resp_ID of the responding field device 2b. Thus, the responding field device 2b effectively opens a communication channel through which it can be directly addressed with requests.

The requesting field device 2a subscribes (subscribe: Req_ID) to response messages 7 whose message titles comprise a request identifier (Req_ID) known to the requesting field device 2a. In this way, the requesting field device 2a effectively opens a communication channel through which it can directly receive responses requested by itself.

The requesting field device 2a publishes (publish: f(F_Resp_ID)/Req_ID) a request message 6 to the data broker 3, where the message title of the request message 6 comprises the request identifier (Req_ID) and the specification (f(F_Resp_ID)) for the field device identifier F_Resp_ID of the responding field device 2b.

Based on the subscription to the request messages 6, the responding field device 2b receives the request message 6 from the requesting field device 2a. The responding field device 2b evaluates the request message 6 8 and publishes (publish: Req_ID) a corresponding response message 7 to the data broker 3, wherein the message title of the response message 7 comprises at least the request identifier Req_ID.

Based on the subscription to the response messages 7, the requesting field device 2a receives the response message 7 from the responding field device 2b. In the figures, only the message title is always indicated for the messages or instructions, with different components of a message title being separated by a slash "/". In a similar way, message titles in the MQTT protocol are structured hierarchically, wherein the message titles and/or instructions shown in the figures do not correspond strictly to the syntax of the MQTT protocol, but are to be understood as written in pseudo code. If the syntax of the MQTT protocol had been used, the subscription of the responding field device 2b, for example, would always have to end with the general place holder "/#" to express, according to the MQTT syntax, that subsequent components of the message title are irrelevant, but this is not the point here.

Figure 1:
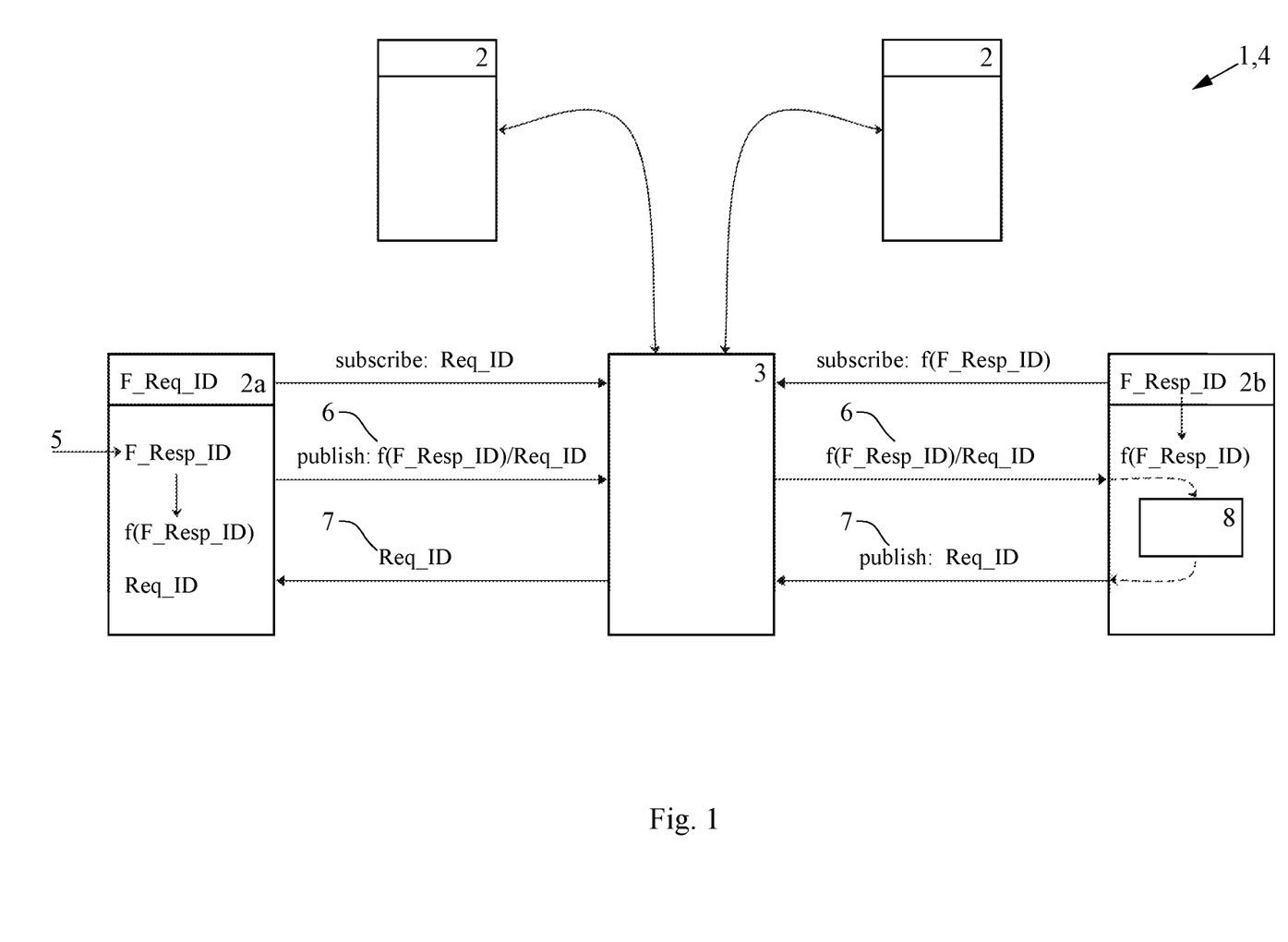
FIG. 1 illustrates a method for exchanging data between multiple field devices and a communication system with multiple field devices and at least one data broker with a broker functionality.

FIG. 1 shows that a unique specification f(F_Resp_ID) for the field device identifier F_Resp_ID of the responding field device 2b is derived from the unique field device identifier F_Resp_ID made known 5 to the requesting field device 2a. This can be done, for example, by an algorithm that is identical on all participating field devices 2, 2a, 2b. This can ensure, for example, that only field devices 2, 2a, 2b explicitly intended for the specific communication system 4 can be incorporated into the communication system 4. In the simplest case, the unique specification f(F_Resp_ID) for the field device identifier F_Resp_ID of the responding field device 2b is simply the field device identifier F_Resp_ID of the responding field device 2b itself (the function f( ) thus simply consists of the identity); this is exemplified in FIG. 2.

Figure 2:
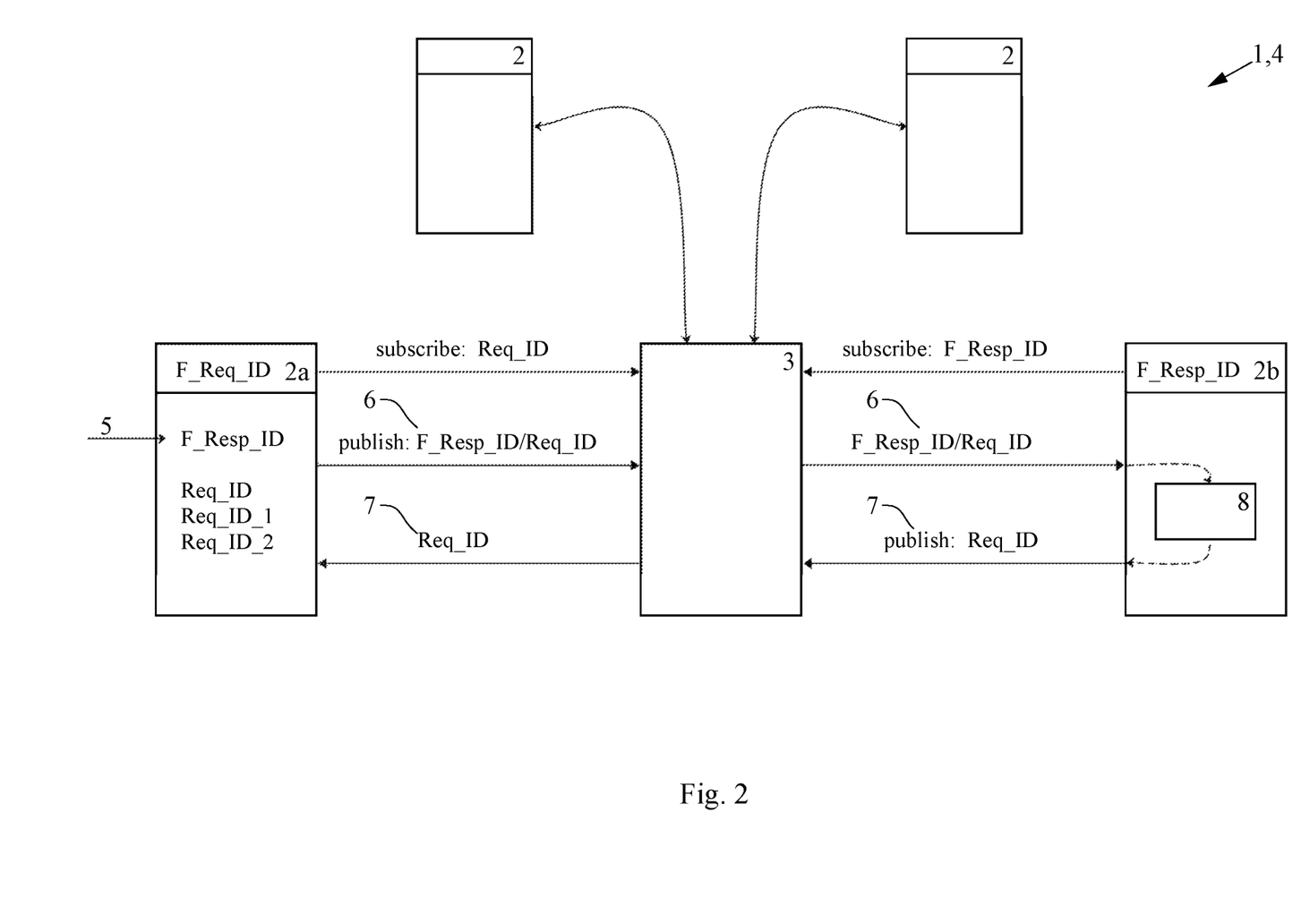
FIG. 2 illustrates an embodiment of the method and the communication system, wherein the specification for the field device identifier is the field device identifier itself.

In the embodiments of the method 1 and the communication system 4 shown in FIGS. 1 to 8, the request identifier Req_ID is a unique identifier for each individual request. In FIG. 2, it is exemplified that the requesting field device 2a has multiple request identifiers Req_ID, Req_ID_1, Req_ID_2.

Figure 3:
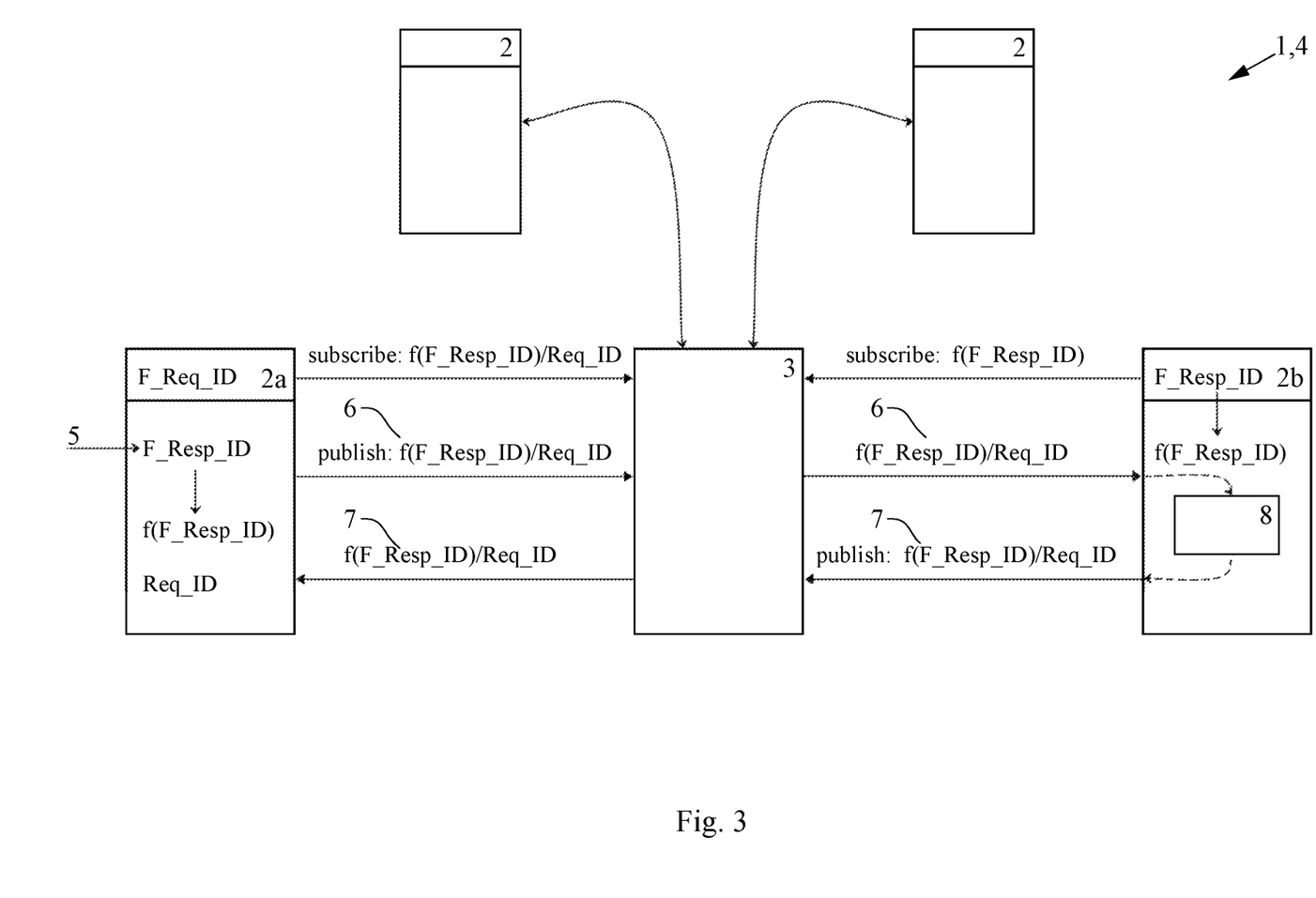
FIG. 3 illustrates an embodiment of the method and the communication system, where the specification for the field device identifier is used in the message title.

FIG. 3 shows that the requesting field device 2a subscribes to response messages 7 (subscribe: f(F_Resp_ID)/Req_ID), the message title of which additionally comprises the specification (f(F_Resp_ID)) for the field device identifier (F_Resp_ID) of the responding field device 2b, and shows that the message title of the response message 7 additionally comprises the specification (f(F_Resp_ID)) for the field device identifier (F_Resp_ID) of the responding field device 2b.

Figure 4:
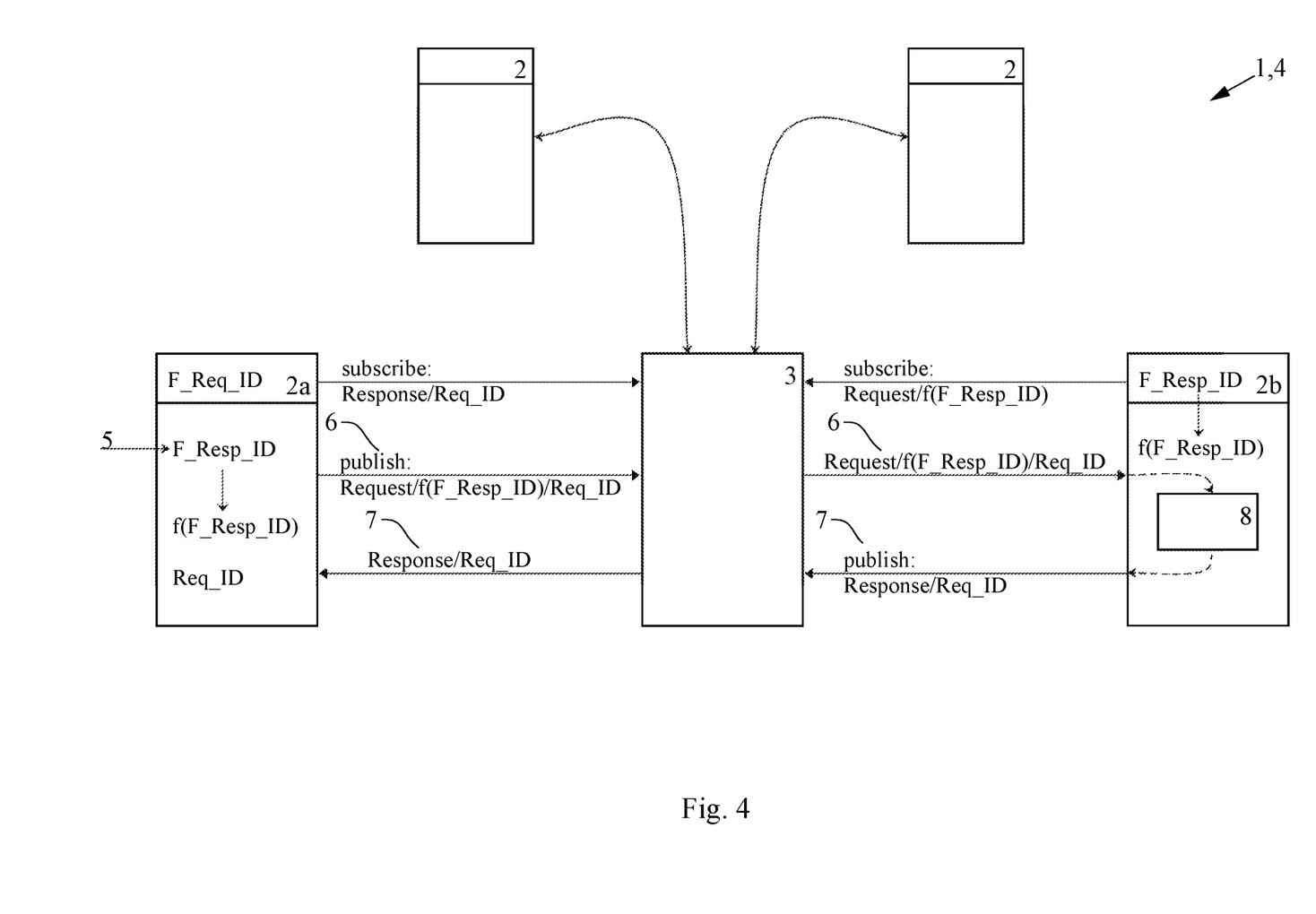
FIG. 4 illustrates an embodiment of the method and the communication system, wherein a request/response identifier is used in the message title.

In the embodiment according to FIG. 4, it is provided that the responding field device 2b subscribes to request messages 6 (subscribe: Request/f(F_Resp_ID)), whose message titles additionally have a Request/Response identifier, and that the requesting field device 2a subscribes to response messages 7 (subscribe: Response/Req_ID), whose message titles additionally have a Request/Response identifier. The requesting field device 2a publishes (publish: Request/f(F_Resp_ID)/Req_ID) a request message 6 to the data broker 3, where the message title of the request message 6 additionally has a Request/Response identifier. The responding field device 2b publishes (publish: Response/Req_ID) the response message 7 to the data broker 3, where the message title of the response message 7 additionally has a Request/Response identifier. The Request/Response identifier identifies either a request (in FIG. 4 by "Request") or a response (in FIG. 4 by "Response"), so that by evaluating the Request/Response identifier it can be decided by the receiving field device 2b whether it is a request or a response to a request.

Figure 5:
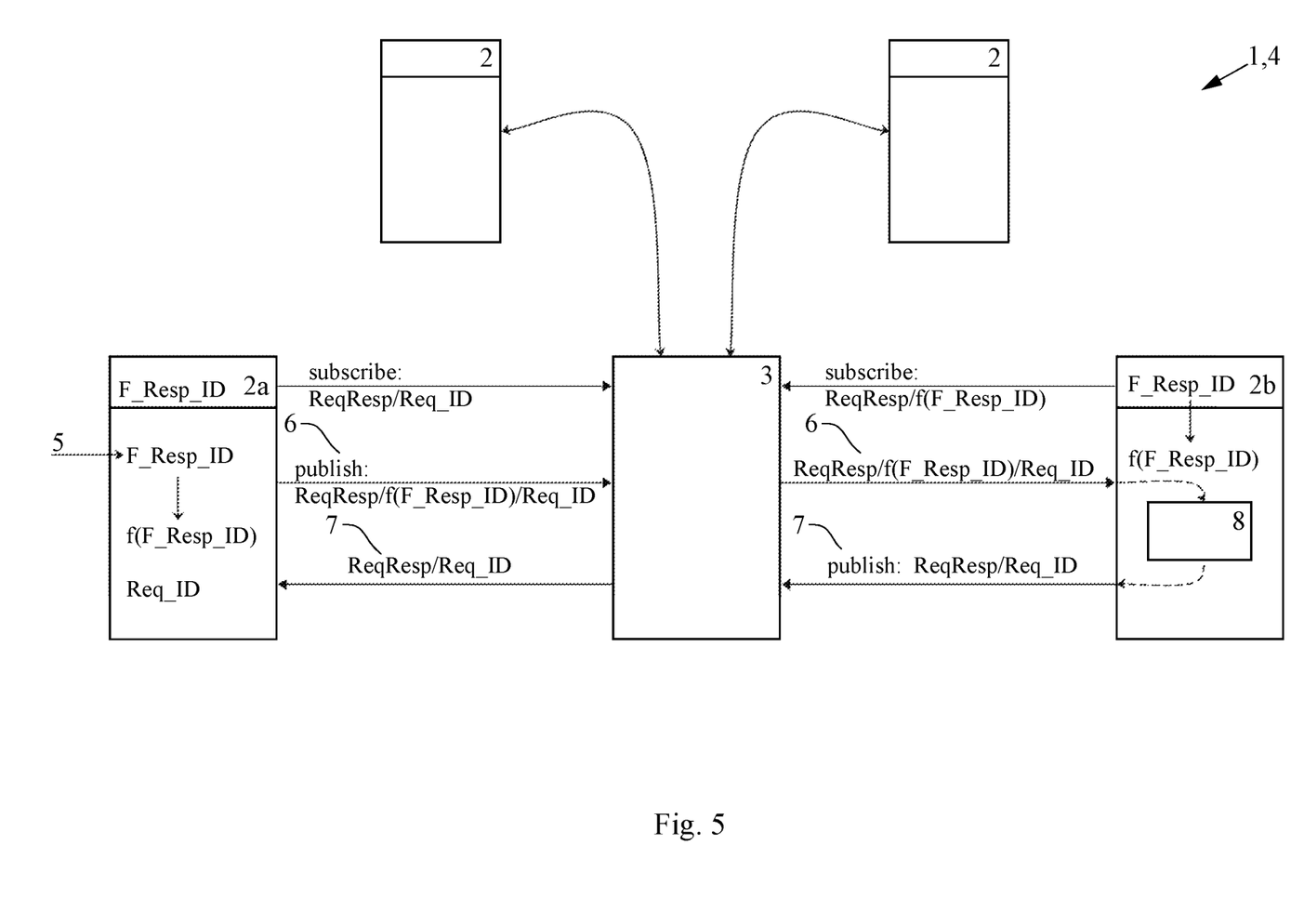
FIG. 5 illustrates an embodiment of the method and the communication system, where a ReqResp identifier is used in the message title.

The Request/Response identifier shown previously with reference to FIG. 4 must not be confused with the Req/Resp identifier used in FIG. 5, which serves an entirely different purpose. The method 1 and the communication system 4 shown in FIG. 5 are characterized in that the responding field device 2b subscribes to request messages 6 (subscribe: ReqResp/f(F_Resp_ID)) whose message titles additionally have a ReqResp identifier ReqResp, and that the requesting field device 2a subscribes to response messages (subscribe: ReqResp/Req_ID) whose message titles additionally have the ReqResp identifier ReqResp. The requesting field device 2a publishes (publish: ReqResp/f(F_Resp_ID)/Req_ID) a request message 6 to the data broker 3, wherein the message title of the request message 6 additionally has the ReqResp identifier ReqResp. The responding field device 2b publishes (publish: ReqResp/Req_ID) the response message 7 to the data broker 3, wherein the message title of the response message 7 additionally has the ReqResp identifier ReqResp, wherein the ReqResp identifier ReqResp identifies a communication via the request/response principle, so that by evaluating the ReqResp identifier ReqResp it can be easily decided whether it is a message with which the request/response principle is implemented or a "normal" message according to the publish-subscribe principle.

Figure 6:
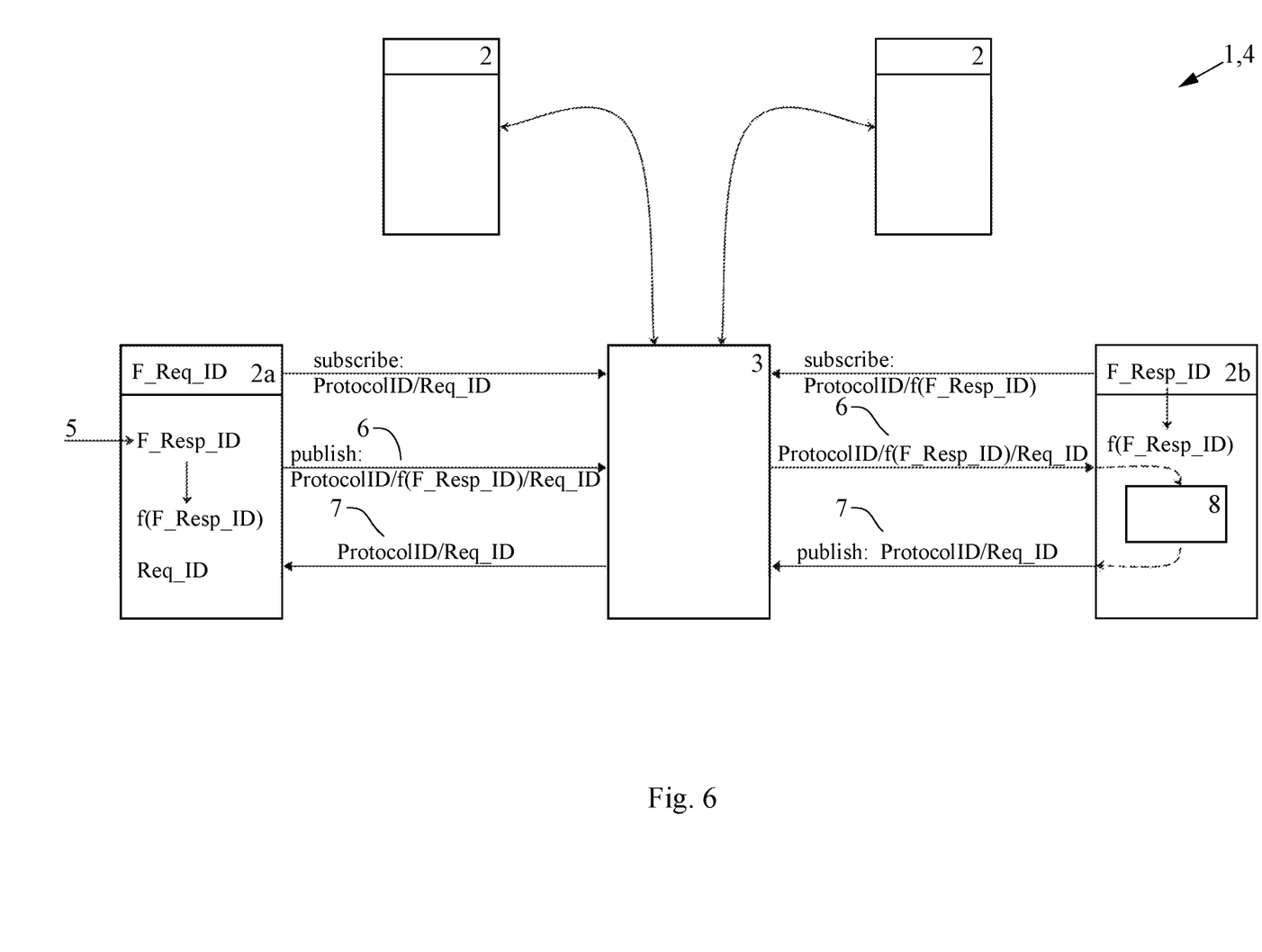
FIG. 6 illustrates an embodiment of the method and the communication system, where a protocol identifier is used in the message title.

The embodiment according to FIG. 6 makes it possible to communicate according to which transmission or message protocol a message is formulated or is to be formulated, which enables the receiving field device 2, 2a, 2b to interpret the message in a targeted manner or enables the sending field device 2, 2a, 2b to compose the message in a targeted manner. For this, it is provided that the responding field device 2b subscribes to request messages 6 (subscribe: ProtocolD/f(F_Resp_ID)), whose message titles additionally have a protocol identifier ProtocolD, that the requesting field device 2a subscribes to response messages 7 (subscribe: ProtocolID/Req_ID), whose message titles additionally have the protocol identifier (ProtocolID), that the requesting field device 2*a* publishes a request message to the data broker 3 (publish: ProtocolID/f(F_Resp_ID)/Req_ID), where the message title of the request message 6 additionally has the protocol identifier ProtocolID, that the responding field device 2*b* publishes the response message 7 to the data broker 3 (publish: ProtocolID/Req_ID), wherein the message title of the response message 7 additionally has the protocol identifier ProtocolID, wherein the protocol identifier ProtocolID indicates which communication protocols are understood by a subscribing field device 2, 2*a*, 2*b* and in which protocol a sending field device 2, 2*a*, 1*b* publishes message contents. For example, the ProtocolID can encode different protocols using numerical values (ProtocolID=1→internal protocol 1; ProtocolID=2→internal protocol 2; ProtocolID=3→MODBUS; ProtocolID=4→HART).

Figure 7:
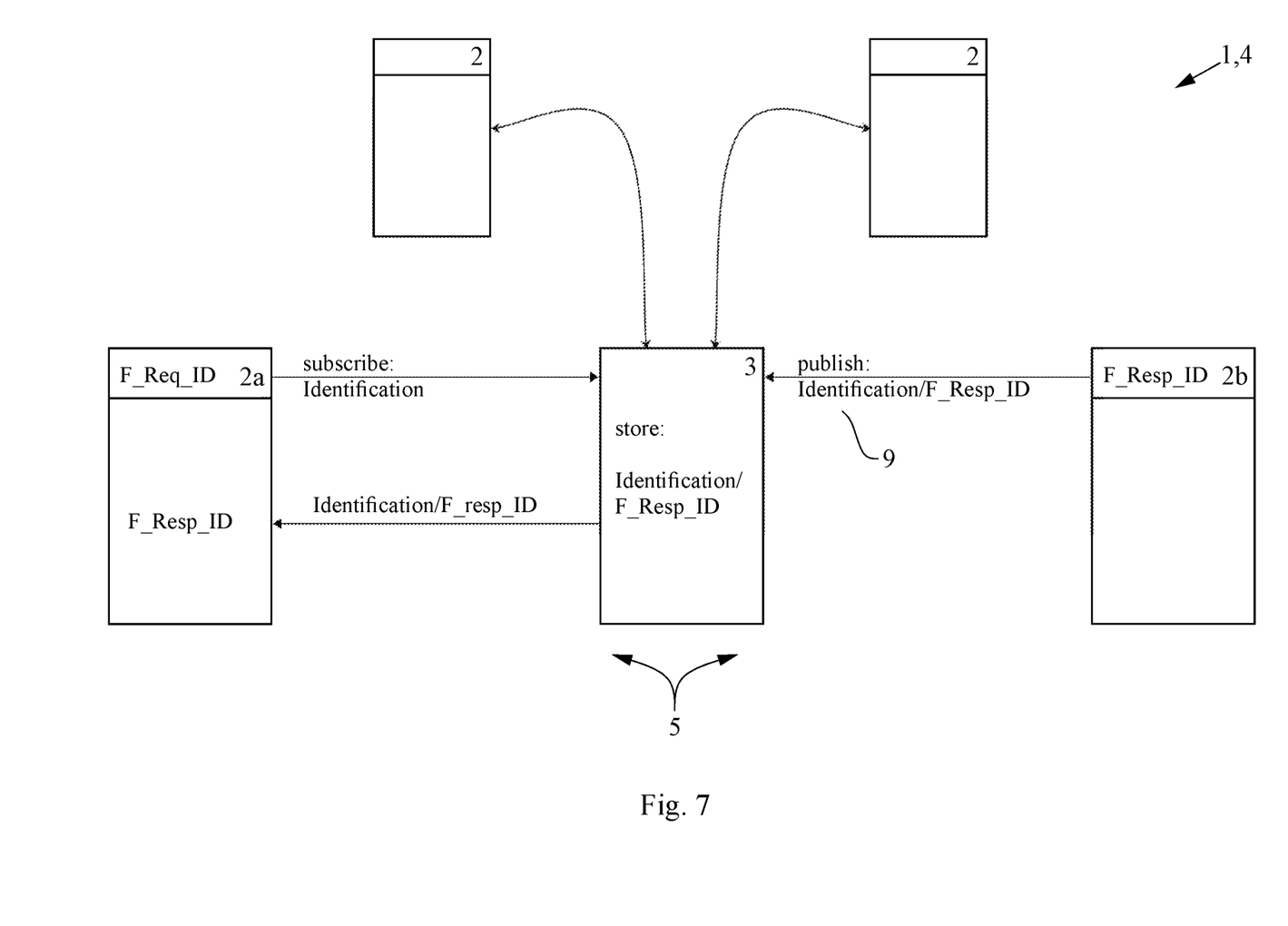
FIG. 7 illustrates an embodiment of the method and the communication system using a log-in message.
Figure 8:
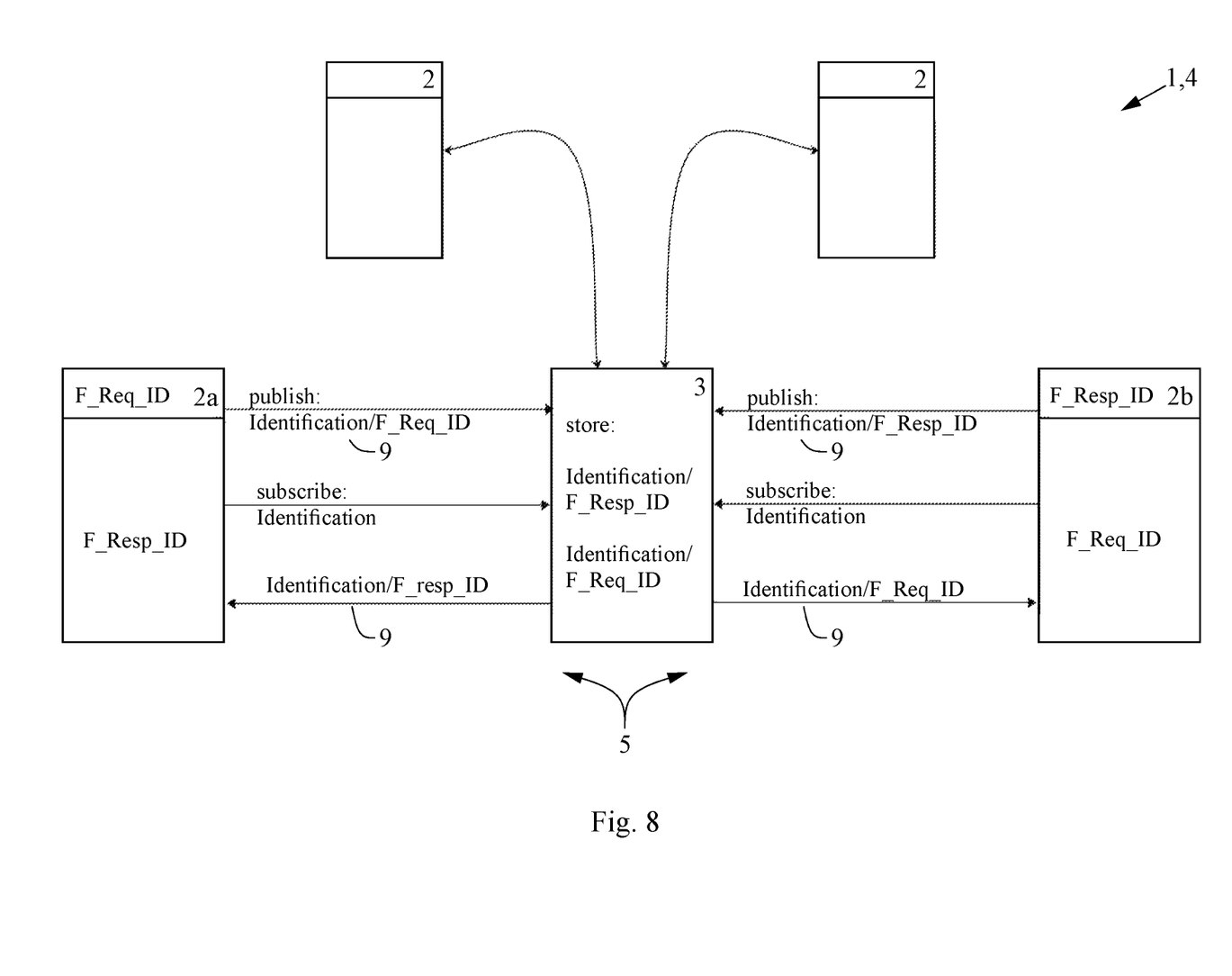
FIG. 8 illustrates an embodiment of the method and the communication system; wherein multiple participants send and receive log-in messages.

On the basis of FIGS. 7 and 8, embodiments of the method 1 and the communication system 4 are shown, which have a preferred registration process of field devices 2, 2*a*, 2*b* and the distribution of registration information—making known 5 the field device identifiers—as their object. For this, it is implemented that at least one field device 2*a*, 2*b* with a unique field device identifier F_Req_ID, F_Resp_ID publishes (publish: Identification/F_Resp_ID; publish: Identification/F_Req_ID) a log-in message 9 with a log-in message title to the data broker 3, wherein the log-in message title comprises a general log-in identifier Identification and the unique field device identifier (F_Resp_ID; F_Req_ID) of the field device 2, 2*a*, 2*b*. The data broker 3 stores the at least one log-in message 9. In the event that another field device 2, 2*a*, 2*b* subscribes to messages with the general log-in identifier Identification in the message title, the data broker 3 publishes the at least one stored log-in message 9 to the field device 2, 2*a*, 2*b* subscribing to log-in messages 9, and the field device 2, 2*a*, 2*b* subscribing to log-in messages 9 obtains an overview of the participating field devices by evaluating the log-in message titles of the received log-in messages 9.

The process 1 and communication systems shown in the figures are implemented in such a way that when a field device 2, 2*a*, 2*b* with a unique field device identifier F_Resp_ID, F_Req_ID is connected to the data broker 3, the field device 2, 2*a*, 2*b* automatically publishes a log-in message 9 to the data broker 3 and that, when a field device 2, 2*a*, 2*b* with a unique field device identifier F_Resp_ID, F_Req_ID is connected to the data broker 3, the field device 2, 2*a*, 2*b* automatically subscribes to messages with the general log-in identifier Identification in the message title.

The invention claimed is:

1. A method for exchanging data between field devices, wherein the field devices are in a communication link based on a publish-subscribe principle via a data broker with a broker functionality, wherein at least one of the field devices publishes at least one message with a message title to the data broker, wherein at least one field device subscribes to a message with at least one specific component of a message title from the data broker, wherein the message sent to the data broker is received by the data broker and the data broker forwards the received message to the at least one of the field devices, which field device has subscribed to the message with the respective component of the message title from the data broker, the method comprising:

implementing an exchange of data based on a request-response principle between a requesting field device and a responding field device by means of the publish-subscribe principle in that a unique field device identifier of the responding field device is made known at least to the requesting field device;

subscribing, the responding field device, to request messages whose message titles include a specification of the field device identifier of the responding field device;

subscribing, by the requesting field device, to response messages whose message titles include a request identifier known to the requesting field device;

publishing, by the requesting field device, a request message to the data broker, wherein a message title of the request message includes the request identifier and the specification of the field device identifier of the responding field device;

receiving, by the responding field device, the request message from the requesting field device on the basis of the subscription to the request messages;

evaluating, by the responding field device, the request message;

publishing, by the responding field device, a corresponding response message to the data broker, wherein a message title of the response message includes at least the request identifier; and receiving, by the requesting field device, the response message of the responding field device based on the subscription to the response message.

2. The method according to claim 1, wherein the request identifier is an invariable specification of the field device identifier of the requesting field device or a unique identifier for each individual request.

3. The method according to claim 1, wherein the requesting field device subscribes to the response messages, whose message titles additionally include a specification for the field device identifier of the responding field device; and wherein the message title of the response message additionally includes the specification for the field device identifier of the responding field device.

4. The method according to claim 1, wherein the responding field device subscribes to the request messages, whose message titles additionally have a request/response identifier;

wherein the requesting field device subscribes to the response messages, whose message titles additionally have a request/response identifier;

wherein the requesting field device publish the request message to the data broker, where the message title of the request message additionally has a request/response identifier;

wherein the responding field device publishes the response message to the data broker;

wherein the message title of the response message additionally has a request/response identifier; and wherein the request/response identifier identifies either a request or a response, so that a decision can be made by a receiving field device whether it is a request or a response to a request by evaluating the request/response identifier.

5. The method according to claim 1, wherein the responding field device subscribes to the request messages, whose message titles additionally have a ReqResp identifier;

Wherein the requesting field device subscribes to the response messages, whose message titles additionally have the ReqResp identifier;

wherein the requesting field device publishes the request message to the data broker;

wherein the message title of the request message additionally has the ReqResp identifier;

wherein the responding field device publishes the response message to the data broker;

wherein the message title of the response message additionally has the ReqResp identifier; and wherein the ReqResp identifier identifies a communication via the request-response principle, so that it can be easily decided by evaluating the ReqResp identifier whether it is a message with which the request-response principle is implemented.

6. The method according to claim 1, wherein the responding field device subscribes to request messages, whose message titles additionally have a protocol identifier;

wherein the requesting field device subscribes to response messages, whose message titles additionally have the protocol identifier;

wherein the requesting field device publishes a request message to the data broker, where the message title of the request message additionally has the protocol identifier;

wherein the responding field device publishes the response message to the data broker;

wherein the message title of the response message additionally has the protocol identifier; and wherein the protocol identifier indicates which communication protocols are understood by a subscribing field device and in which protocol a publishing field device publishes message contents.

7. The method according to claim 1, wherein at least one field device with a unique field device identifier publishes a log-in message with a log-in message title to the data broker, where the log-in message title includes a generic log-in identifier and the unique field device identifier of the field device;

wherein the data broker stores the at least one log-in message; and wherein, in case another field device subscribes to messages with the general log-in identification in the message title, the data broker publishes the at least one stored log-in message to the field device subscribing to log-in messages, and the field device subscribing to the log-in messages obtains an overview of the participating field devices by evaluating the log-in message titles of the received log-in messages.

8. The method according to claim 7, wherein when a field device with a unique field device identifier is connected to the data broker, the field device automatically publishes the log-in message to the data broker and/or wherein when a field device with a unique field device identifier is connected to the data broker, the field device automatically subscribes to messages with the general log-in identifier in the message title.

9. The method according to claim 7, wherein the log-in message title of the log-in message additionally includes a specification of the field device type and/or the field device manufacturer and/or the field device protocol.

10. The method according to claim 1, wherein the broker functionality of the data broker and the communication link based on the publish-subscribe principle are based on the MQTT protocol.

11. A communication system, comprising:
field devices; and
at least one data broker with a broker functionality;
wherein, for the exchange of data between the field devices, the field devices are in a communication link based on a publish-subscribe principle via the data broker;

wherein at least one of the field devices publishes at least one message with a message title to the data broker during operation of the communication system;

wherein at least one field device subscribes to a message with at least one specific component of a message title at the data broker;

wherein the message published to the data broker is received by the data broker and the data broker forwards the received message to the at least one of the field devices, which field device has subscribed to the message with corresponding component of the message title at the data broker;

wherein the field devices and the data broker are set up in such a way that, during operation of the communication system, an exchange of data based on a request-response principle between a requesting field device and a responding field device is implemented by means of the publish-subscribe principle in that a unique field device identifier of the responding field device is made known at least to the requesting field device;

wherein the responding field device subscribes to request messages whose message titles include a specification of the field device identifier of the responding field device;

wherein the requesting field device subscribes to response messages whose message title includes a request identifier known to the requesting field device;

wherein the requesting field device publishes a request message to the data broker;

wherein a message title of the request message includes the request identifier and the specification of the field device identifier of the responding field device;

wherein the responding field device receives the request message from the requesting field device on the basis of the subscription to the request messages, evaluates the request message and publishes a corresponding response message to the data broker, wherein a message title of the response message includes at least the request identifier; and wherein the requesting field device receives the response message from the responding field device on the basis of the subscription to the response message.

12. The communication system according to claim 11, wherein the request identifier is an invariable specification of the field device identifier of the requesting field device or a unique identifier for each individual request.

13. The communication system according to claim 11, wherein the requesting field device subscribes to the response messages, whose message titles additionally include a specification for the field device identifier of the responding field device; and wherein the message title of the response message additionally includes the specification for the field device identifier of the responding field device.

14. The communication system according to claim 11, wherein the responding field device subscribes to the request messages, whose message titles additionally have a request/response identifier;

wherein the requesting field device subscribes to the response messages, whose message titles additionally have a request/response identifier;

wherein the requesting field device publishes the request message to the data broker, where the message title of the request message additionally has a request/response identifier;

wherein the responding field device publishes the response message to the data broker;

wherein the message title of the response message additionally has a request/response identifier; and wherein the request/response identifier identifies either a request or a response, so that a decision can be made by a receiving field device whether it is a request or a response to a request by evaluating the request/response identifier.

15. The communication system according to claim 11, wherein the responding field device subscribes to the request messages, whose message titles additionally have a ReqResp identifier;

wherein the requesting field device subscribes to the response messages, whose message titles additionally have the ReqResp identifier;

wherein the requesting field device publishes the request message to the data broker;

wherein the message title of the request message additionally has the ReqResp identifier;

wherein the responding field device publishes the response message to the data broker;

wherein the message title of the response message additionally has the ReqResp identifier; and wherein the ReqResp identifier identifies a communication via the request-response principle, so that it can be easily decided by evaluating the ReqResp identifier whether it is a message with which the request-response principle is implemented.

16. The communication system according to claim 11, wherein the responding field device subscribes to request messages, whose message titles additionally have a protocol identifier;

wherein the requesting field device subscribes to response messages, whose message titles additionally have the protocol identifier;

wherein the requesting field device publishes a request message to the data broker, where the message title of the request message additionally has the protocol identifier;

wherein the responding field device publishes the response message to the data broker;

wherein the message title of the response message additionally has the protocol identifier; and wherein the protocol identifier indicates which communication protocols are understood by a subscribing field device and in which protocol a publishing field device publishes message contents.

17. The communication system according to claim 11, wherein at least one field device with a unique field device identifier publishes a log-in message with a log-in message title to the data broker, where the log-in message title includes a generic log-in identifier and the unique field device identifier of the field device;

wherein the data broker stores the at least one log-in message; and wherein, in case another field device subscribes to messages with the general log-in identification in the message title, the data broker publishes the at least one stored log-in message to the field device subscribing to log-in messages, and the field device subscribing to the log-in messages obtains an overview of the participating field devices by evaluating the log-in message titles of the received log-in messages.

18. The communication system according to claim 17, wherein when a field device with a unique field device identifier is connected to the data broker, the field device automatically publishes the log-in message to the data broker and/or wherein when a field device with a unique field device identifier is connected to the data broker, the field device automatically subscribes to messages with the general log-in identifier in the message title.

19. The communication system according to claim 17, wherein the log-in message title of the log-in message additionally includes a specification of the field device type and/or the field device manufacturer and/or the field device protocol.

20. The communication system according to claim 11, wherein the broker functionality of the data broker and the communication link based on the publish-subscribe principle are based on the MQTT protocol.

* * * * *